United States Patent
Chau et al.

(10) Patent No.: US 12,435,571 B2
(45) Date of Patent: *Oct. 7, 2025

(54) ADVANCED INGROUND DEVICE POWER CONTROL AND ASSOCIATED METHODS

(71) Applicant: Merlin Technology, Inc., Kent, WA (US)

(72) Inventors: Albert W. Chau, Woodinville, WA (US); Scott Phillips, Normandy Park, WA (US); Benjamin J. Medeiros, Orting, WA (US)

(73) Assignee: Merlin Technology, Inc., Kent, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/533,189

(22) Filed: Dec. 8, 2023

(65) Prior Publication Data

US 2024/0102344 A1    Mar. 28, 2024

Related U.S. Application Data

(63) Continuation of application No. 17/838,841, filed on Jun. 13, 2022, now Pat. No. 11,867,057, which is a
(Continued)

(51) Int. Cl.
*E21B 7/00* (2006.01)
*E21B 7/04* (2006.01)
(Continued)

(52) U.S. Cl.
CPC .............. *E21B 7/046* (2013.01); *E21B 41/00* (2013.01); *E21B 44/005* (2013.01);
(Continued)

(58) Field of Classification Search
CPC ...................................................... E21B 7/046
See application file for complete search history.

(56) References Cited

U.S. PATENT DOCUMENTS

| 3,597,680 A | 8/1971 | Haddon |
| 3,906,504 A | 9/1975 | Guster et al. |
| | (Continued) | |

FOREIGN PATENT DOCUMENTS

| WO | 2007016687 A1 | 2/2007 |
| WO | 2007019319 A1 | 2/2007 |

OTHER PUBLICATIONS

U.S. Appl. No. 17/843,838, filed Jun. 17, 2022, Craig Caswell.
(Continued)

*Primary Examiner* — Adi Amrany
(74) *Attorney, Agent, or Firm* — Pritzkau Patent Group LLC; Michael M Pritzkau

(57) ABSTRACT

A transmitter is powered by a regulated battery voltage and is installable in one of a plurality of different housings, each housing is characterized by a different design and each can form part of an inground tool for performing an inground operation in which a drill string extends from a drill rig to the inground tool. An antenna driver drives an antenna based on the regulated voltage to emanate an electromagnetic signal for remote reception. A controller limits power consumption from the regulated voltage so as not to exceed a power consumption threshold, irrespective of installation of the transmitter in any one of the housings when the transmitter would otherwise exhibit a different power consumption for each housing design. A corresponding method is described. Features relating to power consumption threshold modification based on temperature as well as mechanical shock and vibration are described.

19 Claims, 5 Drawing Sheets

Related U.S. Application Data continuation of application No. 16/119,855, filed on Aug. 31, 2018, now abandoned, which is a continuation of application No. 15/231,782, filed on Aug. 9, 2016, now Pat. No. 10,072,489, which is a continuation of application No. 14/214,074, filed on Mar. 14, 2014, now Pat. No. 9,425,619.

(60) Provisional application No. 61/794,466, filed on Mar. 15, 2013.

(51) Int. Cl.
    *E21B 41/00* (2006.01)
    *E21B 44/00* (2006.01)
    *E21B 47/024* (2006.01)
    *E21B 47/09* (2012.01)
    *E21B 47/125* (2012.01)
    *E21B 47/13* (2012.01)
    *H02J 1/00* (2006.01)
    *H02J 50/80* (2016.01)
    *E21B 47/01* (2012.01)

(52) U.S. Cl.
    CPC ............ *E21B 47/024* (2013.01); *E21B 47/09* (2013.01); *E21B 47/125* (2020.05); *E21B 47/13* (2020.05); *H02J 1/00* (2013.01); *H02J 50/80* (2016.02); *E21B 47/01* (2013.01)

(56) References Cited

U.S. PATENT DOCUMENTS

| | | | |
|---|---|---|---|
| 4,054,881 A | 10/1977 | Raab |
| 4,314,251 A | 2/1982 | Raab |
| 4,361,192 A | 11/1982 | Trowsdale |
| 4,646,277 A | 2/1987 | Bridges et al. |
| 5,065,098 A | 11/1991 | Salsman et al. |
| 5,086,508 A | 2/1992 | Furuno |
| 5,264,795 A | 11/1993 | Rider |
| 5,337,002 A | 8/1994 | Mercer |
| 5,564,101 A | 10/1996 | Eisfeld et al. |
| 5,720,354 A | 2/1998 | Stump et al. |
| 5,878,824 A | 3/1999 | Mercer et al. |
| 6,002,258 A | 12/1999 | Mercer |
| 6,005,532 A | 12/1999 | Ng |
| 6,008,651 A | 12/1999 | Mercer |
| 6,035,951 A | 3/2000 | Mercer et al. |
| 6,079,506 A | 6/2000 | Mercer |
| 6,223,826 B1 | 5/2001 | Chau et al. |
| 6,285,190 B1 | 9/2001 | Brune et al. |
| 6,360,820 B1 | 3/2002 | Laborde et al. |
| 6,411,094 B1 | 6/2002 | Gard et al. |
| 6,496,008 B1 | 12/2002 | Brune et al. |
| 6,606,032 B1 | 8/2003 | Fling |
| 6,727,704 B2 | 4/2004 | Brune et al. |
| 6,737,867 B2 | 5/2004 | Brune et al. |
| 6,756,783 B2 | 6/2004 | Brune et al. |
| 6,776,246 B1 | 8/2004 | Nickel et al. |
| 6,854,535 B1 | 2/2005 | Mizuno |
| 6,980,123 B2 | 12/2005 | Fling |
| 7,025,152 B2 | 4/2006 | Sharp et al. |
| 7,150,331 B2 | 12/2006 | Cole et al. |
| 7,201,236 B1 | 4/2007 | Nickel et al. |
| 7,221,136 B2 | 5/2007 | Olsson et al. |
| 7,251,567 B2 | 7/2007 | Nickel et al. |
| 7,331,409 B2 | 2/2008 | Cole et al. |
| 7,624,816 B2 | 12/2009 | Cole et al. |
| 7,663,373 B1 | 2/2010 | Gard et al. |
| 7,735,555 B2 | 6/2010 | Patel et al. |
| 7,805,263 B2 | 9/2010 | Mack |
| 8,056,619 B2 | 11/2011 | Patel et al. |
| 8,220,564 B2 | 7/2012 | Runquist et al. |
| 8,695,727 B2 | 4/2014 | Chau et al. |
| 9,065,922 B2 | 6/2015 | Khan |
| 9,081,098 B2 | 7/2015 | Misonoo et al. |
| 9,265,560 B2 | 2/2016 | Johnston |
| 9,448,199 B2 | 9/2016 | Roh et al. |
| 9,685,599 B2 | 6/2017 | Petrovski et al. |
| 9,798,033 B2 | 10/2017 | Olsson et al. |
| 10,563,502 B1 | 2/2020 | Phillips et al. |
| 11,867,057 B2 | 1/2024 | Chau |
| 2002/0057074 A1 | 5/2002 | Aoyama et al. |
| 2002/0065062 A1 | 5/2002 | Levesque |
| 2002/0105331 A1 | 8/2002 | Brune et al. |
| 2002/0171560 A1 | 11/2002 | Ciglenec et al. |
| 2003/0095608 A1 | 5/2003 | Duperray |
| 2004/0189487 A1 | 9/2004 | Hoefel et al. |
| 2005/0024233 A1 | 2/2005 | Fling et al. |
| 2006/0012490 A1 | 1/2006 | Fling |
| 2006/0122473 A1 | 6/2006 | Kill et al. |
| 2006/0283632 A1 | 12/2006 | Hall et al. |
| 2007/0149162 A1 | 6/2007 | Greene et al. |
| 2008/0311961 A1 | 12/2008 | Cotevino et al. |
| 2009/0245025 A1 | 10/2009 | Rhodes et al. |
| 2009/0264789 A1 | 10/2009 | Molnar et al. |
| 2010/0090530 A1 | 4/2010 | Watanabe |
| 2010/0214082 A1 | 8/2010 | Covaro et al. |
| 2010/0216521 A1 | 8/2010 | Wu et al. |
| 2010/0253291 A1 | 10/2010 | Lin |
| 2010/0270979 A1 | 10/2010 | Bonkhoff et al. |
| 2011/0001633 A1 | 1/2011 | Lam et al. |
| 2011/0170590 A1 | 7/2011 | Ghabra et al. |
| 2011/0208456 A1 | 8/2011 | Mickelsen |
| 2011/0316715 A1 | 12/2011 | Kato et al. |
| 2012/0109552 A1 | 5/2012 | Hancock et al. |
| 2012/0109553 A1 | 5/2012 | Hancock et al. |
| 2012/0115488 A1 | 5/2012 | Jiang et al. |
| 2012/0169270 A1 | 7/2012 | Cho et al. |
| 2012/0206269 A1 | 8/2012 | Wickman et al. |
| 2012/0211278 A1 | 8/2012 | Gonzalez et al. |
| 2012/0217971 A1 | 8/2012 | DeLuca |
| 2012/0218863 A1 | 8/2012 | Chau et al. |
| 2012/0249323 A1 | 10/2012 | McRae |
| 2012/0254633 A1 | 10/2012 | Vilhauer et al. |
| 2012/0288019 A1 | 11/2012 | Okamura et al. |
| 2012/0306655 A1 | 12/2012 | Tan et al. |
| 2012/0323511 A1 | 12/2012 | Saigo et al. |
| 2013/0017840 A1 | 1/2013 | Moeglein et al. |
| 2013/0028300 A1 | 1/2013 | Alberth et al. |
| 2013/0033233 A1 | 2/2013 | Noda et al. |
| 2013/0093567 A1 | 4/2013 | Garman et al. |
| 2013/0154635 A1 | 6/2013 | Mandal et al. |
| 2013/0162402 A1 | 6/2013 | Amann et al. |
| 2013/0176137 A1 | 7/2013 | Hall et al. |
| 2013/0176139 A1 | 7/2013 | Chau et al. |
| 2013/0200901 A1 | 8/2013 | Olsson et al. |
| 2013/0272449 A1 | 10/2013 | Lusted |
| 2013/0293018 A1 | 11/2013 | Wu et al. |
| 2013/0342178 A1 | 12/2013 | Wang |
| 2014/0055278 A1 | 2/2014 | Chau et al. |
| 2014/0225622 A1 | 8/2014 | Kudo et al. |
| 2014/0252866 A1 | 9/2014 | Walsh et al. |
| 2014/0262513 A1 | 9/2014 | Chau et al. |
| 2014/0265619 A1 | 9/2014 | Chau et al. |
| 2014/0266018 A1 | 9/2014 | Carobolante |
| 2014/0266770 A1 | 9/2014 | Chau et al. |
| 2014/0273885 A1 | 9/2014 | Chen |
| 2014/0286219 A1 | 9/2014 | Siomina et al. |
| 2015/0070186 A1 | 3/2015 | Gonzalez et al. |
| 2015/0072721 A1 | 3/2015 | Lagnado |
| 2016/0069180 A1 | 3/2016 | Zeller et al. |
| 2019/0003299 A1 | 1/2019 | Zeller et al. |
| 2019/0211670 A1 | 7/2019 | Chau et al. |
| 2020/0232317 A1 | 7/2020 | Chau et al. |
| 2022/0311284 A1 | 9/2022 | Chau |

OTHER PUBLICATIONS

International Preliminary Report on Patentability for International Application No. PCT/2014/030605 which is associated with U.S. Appl. No. 14/214,074, Sep. 16, 2015, Alexandria, VA.

(56) References Cited

OTHER PUBLICATIONS

The International Search Report and the Written Opinion of the International Searching Authority for International Application No. PCT/2014/030605 which is associated with U.S. Appl. No. 14/214,074, Jul. 10, 2014, Moscow, Russia.
Written Opinion of the International Preliminary Examining Authority for International Application No. PCT/2014/030605 which is associated with U.S. Appl. No. 14/214,074, May 18, 2015, Alexandria, VA.
Chapter II Demand Relating to the International Search Report and Written Opinion in PCT Application No. PCT/US2022/034336 which is related to U.S. Appl. No. 17/843,838, dated Apr. 21, 2023.
International Preliminary Report on Patentability in PCT Application No. PCT/US2022/034336 which is related to U.S. Appl. No. 17/843,838, dated Aug. 30, 2023.
International Search Report and Written Opinion in PCT Application No. PCT/US2022/034336 which is related to U.S. Appl. No. 17/843,838, dated Oct. 12, 2022.
Office Action in U.S. Appl. No. 17/843,838, dated Jun. 7, 2023, Alexandria, VA.
Prosecution History of U.S. Appl. No. 16/841,641 as of Dec. 28, 2023.
Raghavan, et al., Architectural Comparison of Analog and Digital Duty Cycle Corrector for High Speed I/O Link, 2010 23rd International Conference on VLSI Design, Jan. 2010.
Extended European Search Report for European Application No. 22829149.8-1002 which is related to PCT Application No. PCT/US2022/034336 which is related to U.S. Appl. No. 17/843,838, dated Mar. 10, 2025.

ADVANCED INGROUND DEVICE POWER CONTROL AND ASSOCIATED METHODS

RELATED APPLICATIONS

This application is a continuation application of copending U.S. patent application Ser. No. 17/838,841 filed on Jun. 13, 2022, which is a continuation application of U.S. patent application Ser. No. 16/119,855 filed on Aug. 31, 2018 and now abandoned, which is a continuation application of U.S. patent Ser. No. 15/231,782 filed on Aug. 9, 2016 and now issued as U.S. Pat. No. 10,072,489 on Sep. 11, 2018, which claims priority from U.S. patent application Ser. No. 14/214,074 filed on Mar. 14, 2014 and now issued as U.S. Pat. No. 9,425,619 on Aug. 23, 2016, which claims priority from U.S. Provisional Patent Application Ser. No. 61/794,466 filed on Mar. 15, 2013, the disclosures of which are incorporated herein by reference.

BACKGROUND

The present application is generally related to the field of communications relating to an inground device and, more particularly, to advanced inground device communication power control and associated methods.

While not intended as being limiting, one example of an application which involves the use of an inground device or transmitter is Horizontal Directional Drilling (HDD). The latter can be used for purposes of installing a utility without the need to dig a trench. A typical utility installation involves the use of a drill rig having a drill string that supports a boring tool, serving as one embodiment of an inground tool, at a distal or inground end of the drill string. The drill rig forces the boring tool through the ground by applying a thrust force to the drill string. The boring tool is steered during the extension of the drill string to form a pilot bore. Upon completion of the pilot bore, the distal end of the drill string is attached to a pullback apparatus which is, in turn, attached to a leading end of the utility. The pullback apparatus and utility are then pulled through the pilot bore via retraction of the drill string to complete the installation. In some cases, the pullback apparatus can comprise a back reaming tool, serving as another embodiment of an inground tool, which expands the diameter of the pilot bore ahead of the utility so that the installed utility can be of a greater diameter than the original diameter of the pilot bore.

Steering of a boring tool can be accomplished in a well-known manner by orienting an asymmetric face of the boring tool for deflection in a desired direction in the ground responsive to forward movement. In order to control this steering, it is desirable to monitor the orientation of the boring tool based on sensor readings obtained by sensors in the transmitter that is itself carried by a housing that forms part of the boring tool or other inground tool. The sensor readings, for example, can be modulated onto a locating signal that is transmitted by the transmitter for reception above ground by a portable locator or other suitable above ground device. One class of prior art transmitters is battery powered. It should be appreciated that an inground operation is generally adversely affected by draining the batteries to a degree that renders the transmitter as inoperable, resulting in the need to enter a time consuming process to trip the transmitter out of the ground simply to replace the batteries. While the prior art includes approaches for attempting to conserve and/or enhance battery power, Applicants have discovered additional limitations and concerns relating to battery powered transmitters that are submitted to be unrecognized by the prior art and which are discussed in detail hereinafter.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In an aspect of the disclosure, a transmitter and associated method are described in which the transmitter is powered by a battery and configured for installation in one of a plurality of different housings each of which housings is characterized by a different housing design and each of which can form part of an inground tool for performing an inground operation in which a drill string extends from a drill rig to the inground tool. A regulator forms part of the transmitter for generating a regulated voltage from the battery. An antenna driver is powered from the regulated voltage for electrically driving an antenna to emanate an electromagnetic signal for remote reception based on power consumption from the battery via the regulator. A controller is configured for limiting the power consumption so as not to exceed a power consumption threshold, irrespective of installation of the transmitter in housings where the transmitter would otherwise exhibit a different power consumption for such housings based on each housing design exhibiting a different housing-attributable signal attenuation of the electromagnetic signal.

BRIEF DESCRIPTIONS OF THE DRAWINGS

Example embodiments are illustrated in referenced figures of the drawings. It is intended that the embodiments and figures disclosed herein are to be illustrative rather than limiting.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiments shown, but is to be accorded the widest scope consistent with the principles and features described herein including modifications and equivalents. It is noted that the drawings are not to scale and are diagrammatic in nature in a way that is thought to best illustrate features of interest. Descriptive terminology may be adopted for purposes of enhancing the reader's understanding, with respect to the various views provided in the figures, and is in no way intended as being limiting.

Figure 1:
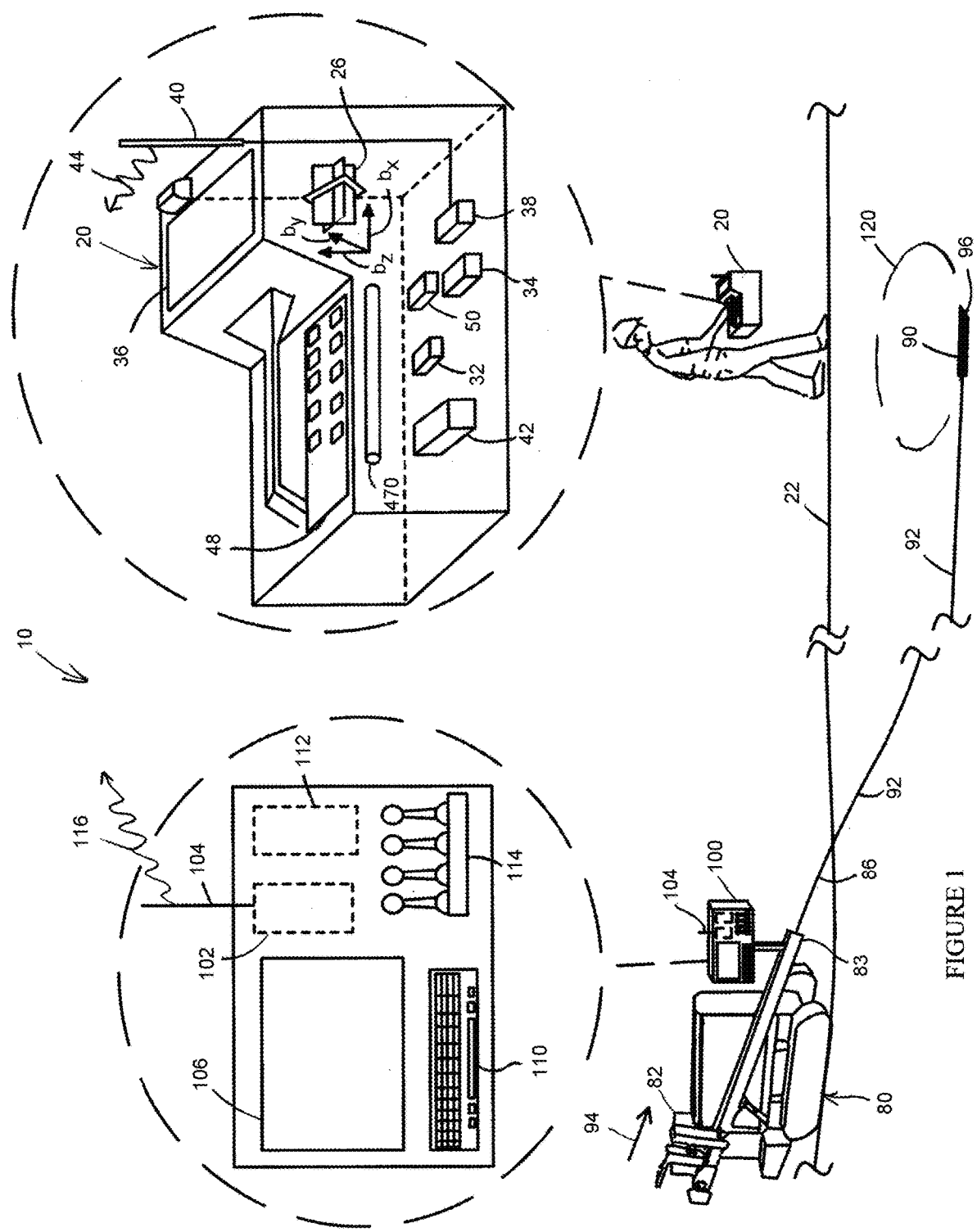
FIG. 1 is a diagrammatic view of an embodiment of a system for performing an inground operation which utilizes an inground transmitter or electronics package with advanced transmit power control in accordance with the present disclosure.

Turning now to the drawings, wherein like items may be indicated by like reference numbers throughout the various figures, attention is immediately directed to FIG. 1, which illustrates one embodiment of a system for performing an inground operation, generally indicated by the reference number 10. The system includes a portable device 20 that is shown being held by an operator above a surface 22 of the ground as well as in a further enlarged inset view. It is noted that inter-component cabling within device 20 has not been illustrated in order to maintain illustrative clarity, but is understood to be present and may readily be implemented by one having ordinary skill in the art in view of this overall disclosure. Device 20 includes a three-axis antenna cluster 26 measuring three orthogonally arranged components of magnetic flux indicated as $b_x$, $b_y$ and $b_z$. One useful antenna cluster contemplated for use herein is disclosed by U.S. Pat. No. 6,005,532 which is commonly owned with the present application and is incorporated herein by reference. Antenna cluster 26 is electrically connected to a receiver section 32. A tilt sensor arrangement 34 may be provided for measuring gravitational angles from which the components of flux in a level coordinate system may be determined.

Device 20 can further include a graphics display 36, a telemetry arrangement 38 having an antenna 40 and a processing section 42 interconnected appropriately with the various components. The telemetry arrangement can transmit a telemetry signal 44 for reception at the drill rig. The processing section can include a digital signal processor (DSP) or any suitable processor that is configured to execute various procedures that are needed during operation. It should be appreciated that graphics display 36 can be a touch screen in order to facilitate operator selection of various buttons that are defined on the screen and/or scrolling can be facilitated between various buttons that are defined on the screen to provide for operator selection. Such a touch screen can be used alone or in combination with an input device 48 such as, for example, a keypad. The latter can be used without the need for a touch screen. Moreover, many variations of the input device may be employed and can use scroll wheels and other suitable well-known forms of selection device. The processing section can include components such as, for example, one or more processors, memory of any appropriate type and analog to digital converters. As is well known in the art, the latter should be capable of detecting a frequency that is at least twice the frequency of the highest frequency of interest. Other components may be added as desired such as, for example, a magnetometer 50 to aid in position determination relative to the drill direction and ultrasonic transducers for measuring the height of the device above the surface of the ground.

Still referring to FIG. 1, system 10 further includes drill rig 80 having a carriage 82 received for movement along the length of an opposing pair of rails 83. An inground tool 90 is attached at an opposing end of a drill string 92. By way of non-limiting example, a boring tool is shown as the inground tool and is used as a framework for the present descriptions, however, it is to be understood that any suitable inground device may be used such as, for example, a reaming tool for use during a pullback operation or a mapping tool. Generally, drill string 92 is made up of a plurality of removably attachable drill pipe sections such that the drill rig can force the drill string into the ground using movement in the direction of an arrow 94 and retract the drill string responsive to an opposite movement. Each drill pipe section or rod can include a box fitting at one end and a pin fitting at an opposing end in a well-known manner. The drill pipe sections can define a through passage for purposes of carrying a drilling mud or fluid that is emitted from the boring tool under pressure to assist in cutting through the ground as well as cooling the drill head. Generally, the drilling mud also serves to suspend and carry out cuttings to the surface along the exterior length of the drill string. Steering can be accomplished in a well-known manner by orienting an asymmetric face 96 of the boring tool for deflection in a desired direction in the ground responsive to forward, push movement which can be referred to as a "push mode." Rotation or spinning of the drill string by the drill rig will generally result in forward or straight advance of the boring tool which can be referred to as a "spin" or "advance" mode.

The drilling operation is controlled by an operator (not shown) at a control console (best seen in the enlarged inset view) which itself includes a telemetry transceiver 102 connected with a telemetry antenna 104, a display screen 106, an input device such as a keyboard 110, a processing arrangement 112 which can include suitable interfaces and memory as well as one or more processors. A plurality of control levers 114, for example, control movement of carriage 82. Telemetry transceiver 102 can transmit a telemetry signal 116 to facilitate bidirectional communication with portable device 20. In an embodiment, screen 106 can be a touch screen such that keyboard 110 may be optional.

Device 20 is configured for receiving an electromagnetic locating signal 120 that is transmitted from the boring tool or other inground tool. The locating signal can be a dipole signal. In this instance, the portable device can correspond, for example, to the portable device described in any of U.S. Pat. Nos. 6,496,008, 6,737,867, 6,727,704, as well as U.S. Published Patent Application no. 2011-0001633 each of which is incorporated herein by reference. In view of these patents, it will be appreciated that the portable device can be operated in either a walkover locating mode, as illustrated by FIG. 1, or in a homing mode having the portable device placed on the ground, as illustrated by the U.S. Pat. No. 6,727,704. While the present disclosure illustrates a dipole locating field transmitted from the boring tool and rotated about the axis of symmetry of the field, the present disclosure is not intended as being limiting in that regard.

Locating signal 120 can be modulated with information generated in the boring tool including, but not limited to position orientation parameters based on pitch and roll orientation sensor readings, temperature values, pressure values, battery status, tension readings in the context of a pullback operation, and the like. Device 20 receives signal 120 using antenna array 26 and processes the received signal to recover the data. It is noted that, as an alternative to modulating the locating signal, the subject information can be carried up the drill string to the drill rig using electrical conduction such as a wire-in-pipe arrangement. In another embodiment, bi-directional data transmission can be accomplished by using the drill string itself as an electrical conductor. An advanced embodiment of such a system is described in commonly owned U.S. application Ser. No. 13/733,097, now published as U.S. Published Application no. 2013/0176139, which is incorporated herein by reference in its entirety. In either case, all information can be made available to console at the drill rig.

Figure 2:
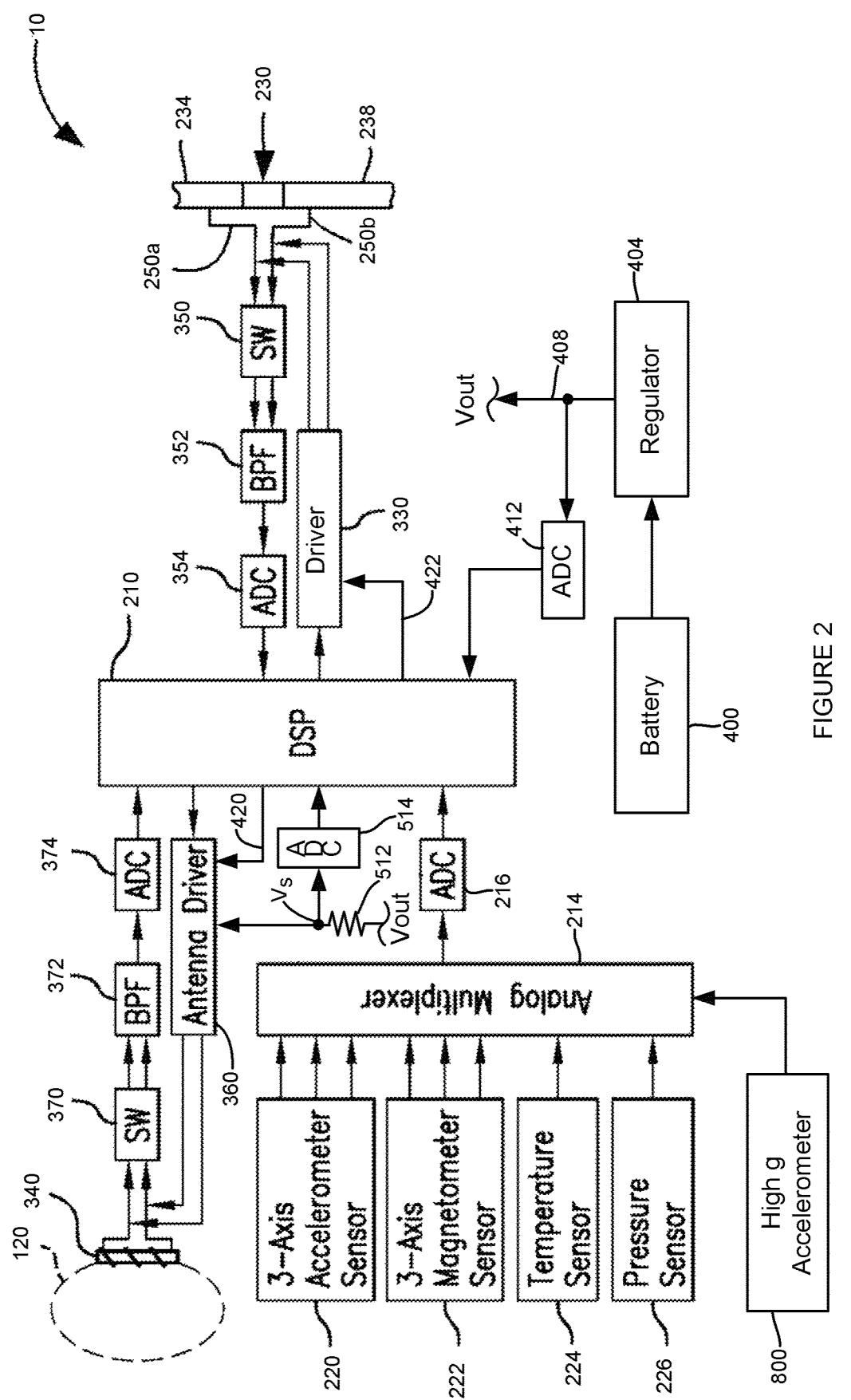
FIG. 2 is a block diagram that illustrates an embodiment of an electronics package for use in an inground device or tool in accordance with the present disclosure.

FIG. 2 is a block diagram which illustrates an embodiment of an electronics package, generally indicated by the reference number 200, which can be supported by boring tool 90. The electronics package can include an inground digital signal processor 210. A sensor section can be electrically connected to digital signal processor 210 via an analog to digital converter (ADC) 216. Any suitable combination of sensors can be provided for a given application and can be selected, for example, from an accelerometer 220, a magnetometer 222, a temperature sensor 224 and a pressure sensor 226 which can sense the pressure of drilling fluid prior to being emitted from the drill string and/or within the annular region surrounding the downhole portion of the drill string. In an embodiment which implements communication to the drill rig via the use of the drill string as an electrical conductor, an isolator 230 forms an electrically isolating connection in the drill string and is diagrammatically shown as separating an uphole portion 234 of the drill string from a downhole portion 238 of the drill string for use in one or both of a transmit mode, in which data is coupled onto the drill string, and a receive mode in which data is recovered from the drill string. In some embodiments, the electrical isolation can be provided as part of the inground tool. The electronics section can be connected, as illustrated, across the electrically insulating/isolating break formed by the isolator by a first lead 250a and a second lead 250b which can be referred to collectively by the reference number 250. For the transmit mode, an isolator driver section 330 is used which is electrically connected between inground digital signal processor 210 and leads 250 to directly drive the drill string. Generally, the data that can be coupled into the drill string can be modulated using a frequency that is different from any frequency that is used to drive a dipole antenna 340 that can emit aforedescribed signal 120 (FIG. 1) in order to avoid interference. When isolator driver 330 is off, an On/Off Switcher (SW) 350 can selectively connect leads 250 to a band pass filter (BPF) 352 having a center frequency that corresponds to the center frequency of the data signal that is received from the drill string. BPF 352 is, in turn, connected to an analog to digital converter (ADC) 354 which is itself connected to digital signal processing section 210. In an embodiment, a DC blocking anti-aliasing filter can be used in place of a band pass filter. Recovery of the modulated data in the digital signal processing section can be readily configured by one having ordinary skill in the art in view of the particular form of modulation that is employed.

Still referring to FIG. 2, dipole antenna 340 can be connected for use in one or both of a transmit mode, in which signal 120 is transmitted into the surrounding earth, and a receive mode in which an electromagnetic signal such as a signal from an inground tool such as, for example, a tension monitor is received. For the transmit mode, an antenna driver section 360 is used which is electrically connected between inground digital signal processor 210 and dipole antenna 340 to drive the antenna. Again, the frequency of signal 120 will generally be sufficiently different from the frequency of the drill string signal to avoid interference therebetween. When antenna driver 360 is off, an On/Off Switcher (SW) 370 can selectively connect dipole antenna 340 to a band pass filter (BPF) 372 having a center frequency that corresponds to the center frequency of the data signal that is received from the dipole antenna. In an embodiment, a DC blocking anti-aliasing filter can be used in place of a band pass filter. BPF 372 is, in turn, connected to an analog to digital converter (ADC) which is itself connected to digital signal processing section 210. Transceiver electronics for the digital signal processing section can be readily configured in many suitable embodiments by one having ordinary skill in the art in view of the particular form or forms of modulation employed and in view of this overall disclosure. A battery 400 provides electrical power to a voltage regulator 404. A voltage output, $V_{out}$, 408 can include one or more output voltage values as needed by the various components of the electronics package. The output voltage of battery 400 can be monitored, for example, by DSP 210 using an analog to digital converter 412. Control lines 420 and 422 from the DSP to drivers 360 and 330, respectively, can be used, for example, to customize locating signal 120 transmit power and/or drill string transmit power that is provided to isolator 230. The transmit power can be modified, for example, by changing the gain at which antenna driver 360 amplifies the signal that is provided from the DSP. The electronics package can be modified in any suitable manner in view of the teachings that have been brought to light herein. For example, in another embodiment, transmit power can be modified in another manner either in conjunction with gain control or independently, as will be described.

Figure 3A:
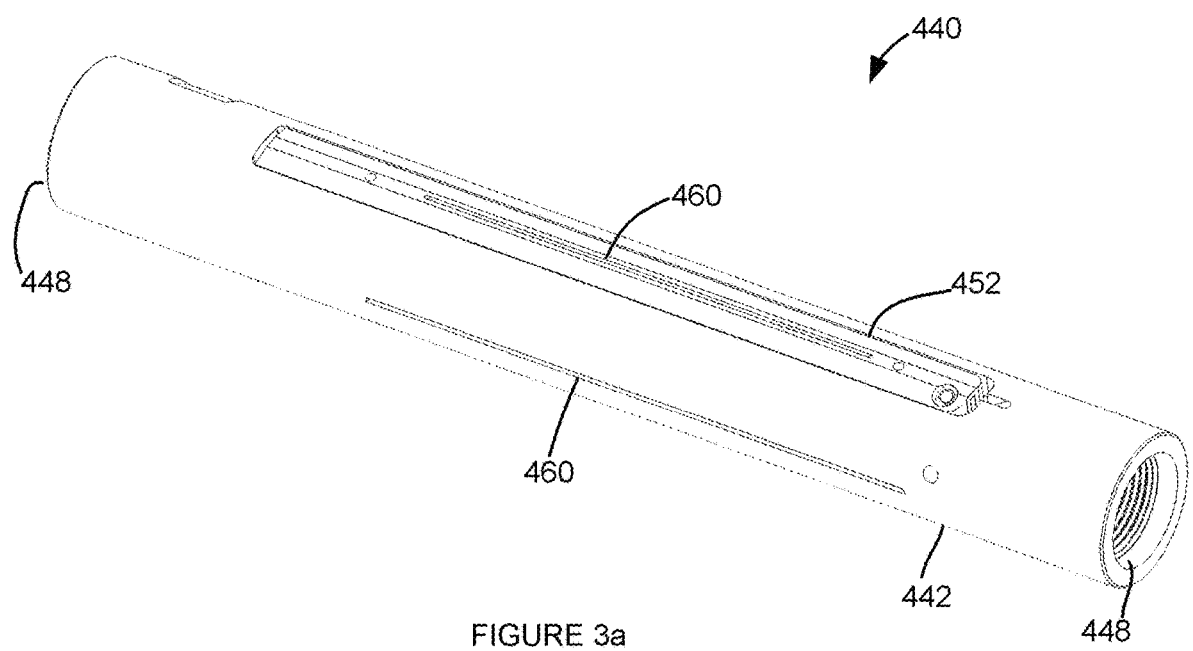
FIG. 3a is a diagrammatic view, in perspective, showing an embodiment of a housing for receiving an electronics package in accordance with the present disclosure.
Figure 3B:
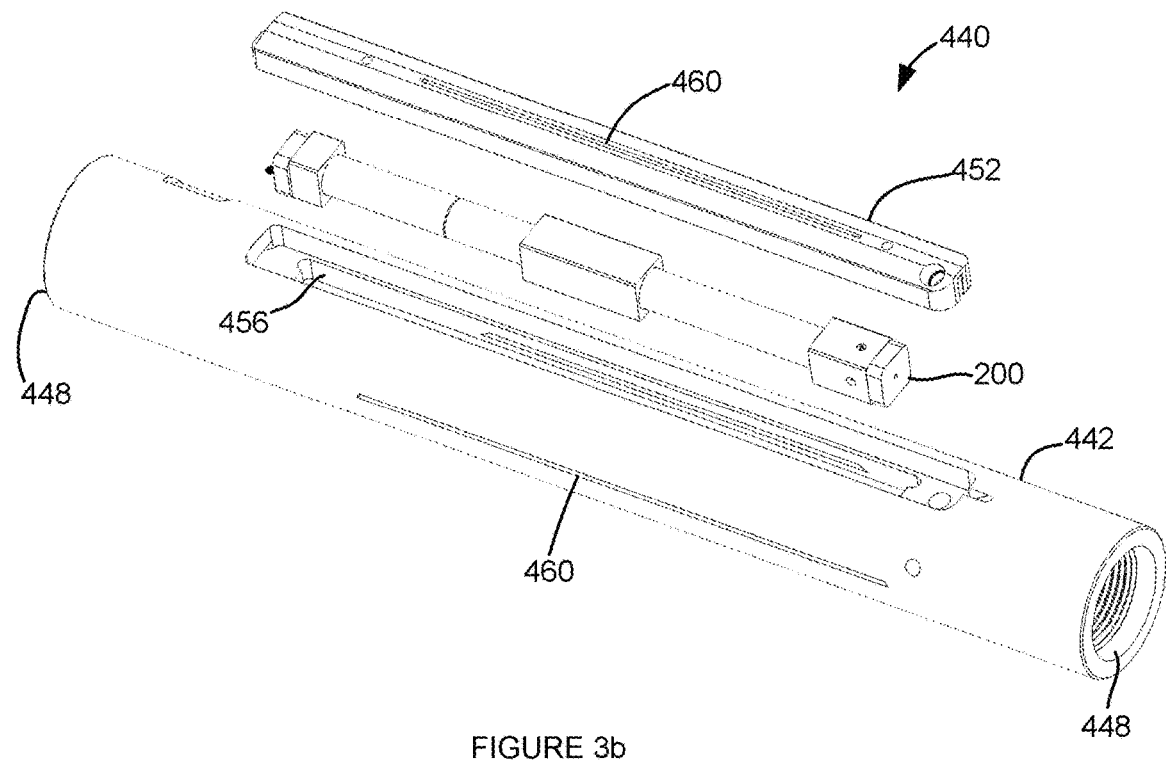
FIG. 3b is an exploded diagrammatic view, in perspective, showing the electronics package in relation to a housing cover and body.

Referring to FIGS. 3a and 3b, an embodiment of a housing arrangement is diagrammatically illustrated and generally indicated by the reference number 440. The housing arrangement includes a housing body 442 to which a drill head or other inground apparatus can be removably attached. By way of example, housing arrangement 440 can form part of inground tool 90 of FIG. 1. FIG. 3a is a diagrammatic assembled perspective view of the housing while FIG. 3b is a diagrammatic, partially exploded view, in perspective. Housing body 442 can define fittings such as, for example, the box and pin fittings that are used by the drill rods. In an embodiment, the housing body can define a box fitting 448 at each of its opposing ends. Housing arrangement 440 comprises what is often referred to as a side load housing. A housing lid 452 is removably receivable on the housing body. The housing body defines a cavity 456 for receiving electronics package 200. The housing body and housing lid can define a plurality of elongated slots 460 for purposes of limiting eddy currents that would otherwise attenuate the emanation of locating signal 120 (FIGS. 1 and 2) from within the housing arrangement or that would otherwise attenuate reception of an aboveground signal being transmitted from portable device 20 of FIG. 1 for reception by antenna (FIG. 2) in the electronics package. The aboveground signal, for example, can be transmitted from a dipole antenna 470 that forms part of portable device 20. It should be appreciated that the housing arrangement of FIGS. 3a and 3b comprises one example of a virtually unlimited range of embodiments of housings that are currently available, as will be further discussed immediately hereinafter.

As the result of numerous manufacturers of downhole tooling, specifically housing arrangements for supporting a given inground electronics package, there are many design configurations, each design characterized by its own manufacturing tolerances, but all of which are intended to support the interoperability of the given electronics package for use in a walk-over locating and/or homing system. The number of different housing types is still further compounded with respect to the different sizes and types of electronics packages offered in the market. Applicants recognize and have empirically demonstrated that variations in tooling design, among other factors, can significantly influence the performance of a transmitter that is part of an inground electronics package and supported by the housing. For purposes of the remainder of this disclosure, the inground electronics package may be referred to interchangeably as a transmitter.

As part of Applicants' recognitions, it has been discovered that tooling design variables including, but not limited to wall thickness, the amount of metal in proximity to the transmitter, housing slot lengths and size, each can contribute to transmitter performance. Transmitter performance in this context is considered as the amount of transmitter power consumption, which can generally be characterized as the amount of current that is drawn from a stable power source. The present disclosure, for purposes of providing a framework of descriptive nomenclature, may refer to a standard housing that can be considered as optimized for a particular transmitter. It should be appreciated that ongoing development can result in improvements to what can be considered as a standard housing. In any case, Applicants have measured transmitter power consumption in alternative or non-standard housings that is in excess of 30% more than what is considered as typical for a standard housing with the same transmitter. For example, a specific transmitter with nominal current draw of 160 mA (0.48 Watts) in a standard housing can draw an operating current of 200 mA (0.6 Watts) in a modified or different housing that is not optimized for the specific transmitter. It should be appreciated that the increase in power consumption negatively affects the battery life of the transmitter when installed in the modified housing. Battery life can be considered in this context as the operating time of a transmitter during which operating time the transmitter at least generally exhibits a stable output power or the battery supplies at least sufficient voltage to satisfy the power requirements of the power supply such as, for example, regulator 404 of FIG. 2 that provides power to the remainder of the electronics. In this regard, a longer operating time is beneficial to the end user at least for the reason that it reduces the number of times the transmitter is required to be removed from a bore to replace the batteries.

Applicants recognize that one approach for addressing increased power consumption caused by varying housing design resides in implementing a constant power transmitter configuration. A constant power configuration or design is considered to be a transmitter that does not exhibit a variable power consumption with respect to housing design. While not intending to be bound by theory, Applicants believe that variation in power consumption from one housing design to the next is attributable to the amount of signal attenuation that is caused by each housing design. Such housing-attributable signal attenuation can be thought of as a low resistance circuit that is connected in parallel to the transmitter output. The subject constant power design is accomplished, in one embodiment, by measuring the amount of power the transmitter, through the measurement of voltage and current input, is consuming after stabilization following power-up. The transmitter then adjusts transmit power to achieve a desired or target power consumption. As noted above, an acceptable power consumption, by way of non-limiting example, can be set at less than 0.5 Watts. Such a power consumption value can be established in view of a variety of different factors including those discussed below.

Figure 4:
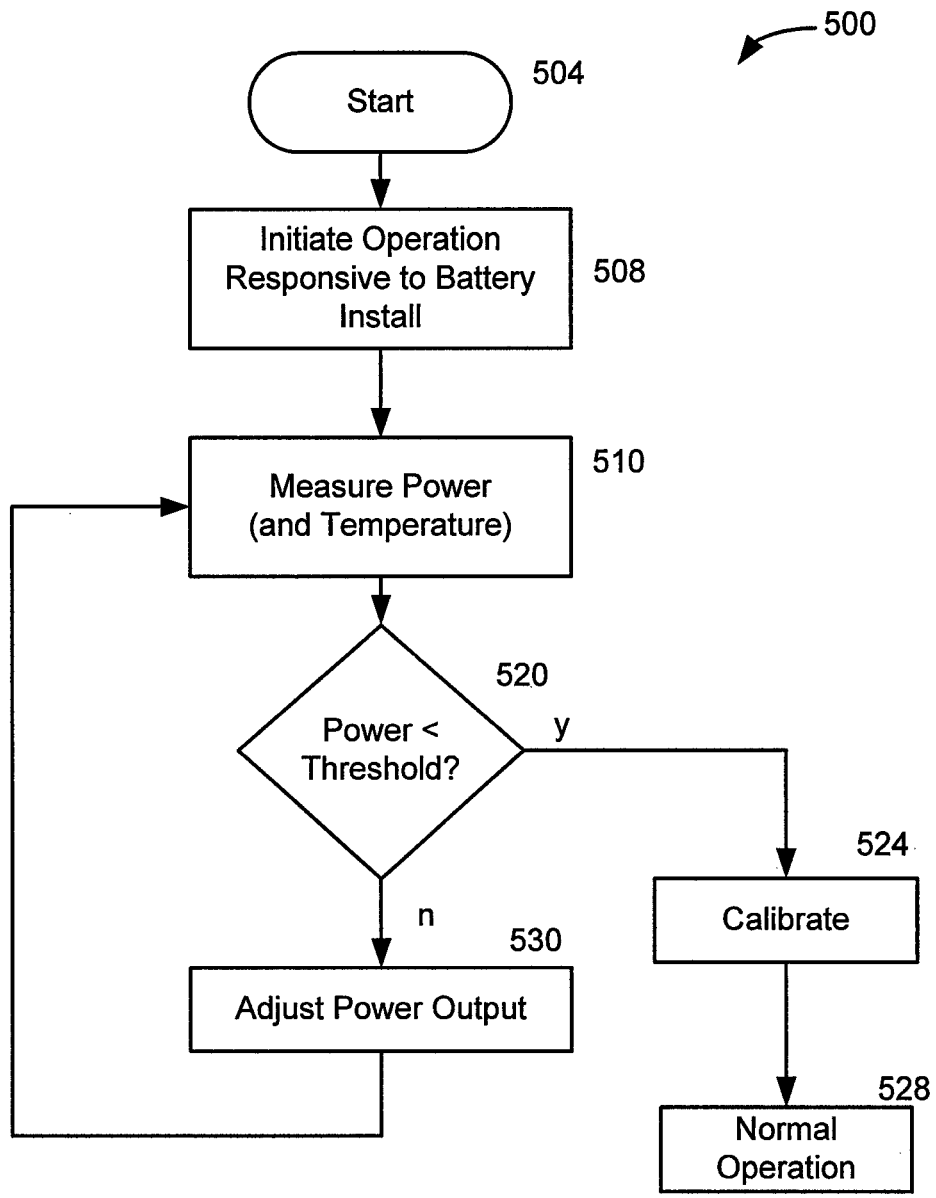
FIG. 4 is a flow diagram illustrating an embodiment of a method for operating an inground device in accordance with the present disclosure.

Attention is now directed to FIG. 4 which is a flow diagram depicting an embodiment of a method, generally indicated by the reference number 500, that provides for constant transmitter power consumption in accordance with the present disclosure. The method begins at start 504 and includes preparation of the housing arrangement and transmitter, for example, by installing the transmitter in the housing and then installing the lid on the housing in the instance of a side load housing. In other words, the housing and transmitter are arranged in the same configuration that is to be employed during the inground operation. Operation then proceeds to 508 which initiates transmitter operation responsive, for example, to installation of batteries or through any suitable instruction to the inground electronics package to initiate transmission of locating signal 120. It is noted that such a suitable instruction can be transmitted from the drill rig to the inground electronics package using the drill string as an electrical conductor. At 510, once the transmission power has stabilized, the power that is being provided to antenna driver 360 can be measured. In an embodiment, wherein antenna driver 360 directly uses $V_{out}$ of voltage regulator 404, power measurement, for example, can be accomplished based on the output of analog to digital converter (FIG. 2) that measures the output voltage of regulator 404. The current that is supplied to the antenna is measured, for example, using a current sensing resistor 512, having a fixed, known resistance such as, for example, 0.02 ohms. Such a low resistance provides a negligible voltage drop, however, the voltage drop accurately characterizes the current flow. A voltage $V_s$ at the sensing resistor is monitored by an ADC 514 that, in turn, is monitored by DSP 210. The voltage across the sensing resistor can be determined as $V_{out}$-$V_s$. This voltage is divided by the known resistance of the series resistor, per Ohm's law, to obtain the current that is flowing to antenna driver 360. Of course, the power in Watts being fed to antenna driver 360 and thereby antenna 120 at any given time can be determined through multiplication of $V_s$ by the determined current flow. With the power determination in hand, at 520, the power consumption value is compared to a threshold power value. If the measurement-based power is less than the threshold, operation branches to 524 in which a calibration procedure can be performed to appropriately correlate signal strength to distance, for example, by measuring the signal strength at a known distance from the transmitter and determining calibration coefficients in a well-known manner. Subsequently, normal operation can be entered at 528. If the power level is above the threshold at 520, the transmit power is adjusted at 530, for example, by adjusting the gain of antenna driver 360 and/or the duty cycle of its output waveform to reduce power consumption. In this regard, co-pending U.S. application Ser. No. 14/213,644, is incorporated by reference in its entirety and describes in detail the use of duty cycle for purposes of controlling transmitter output power. In an embodiment, steps 510, 520 and 530 can operate in an iterative loop to incrementally adjust the transmit power by an appropriate step value to converge on the threshold. Once the decision at 520 is satisfied, normal operation 528 proceeds following calibration 524.

Figure 5:
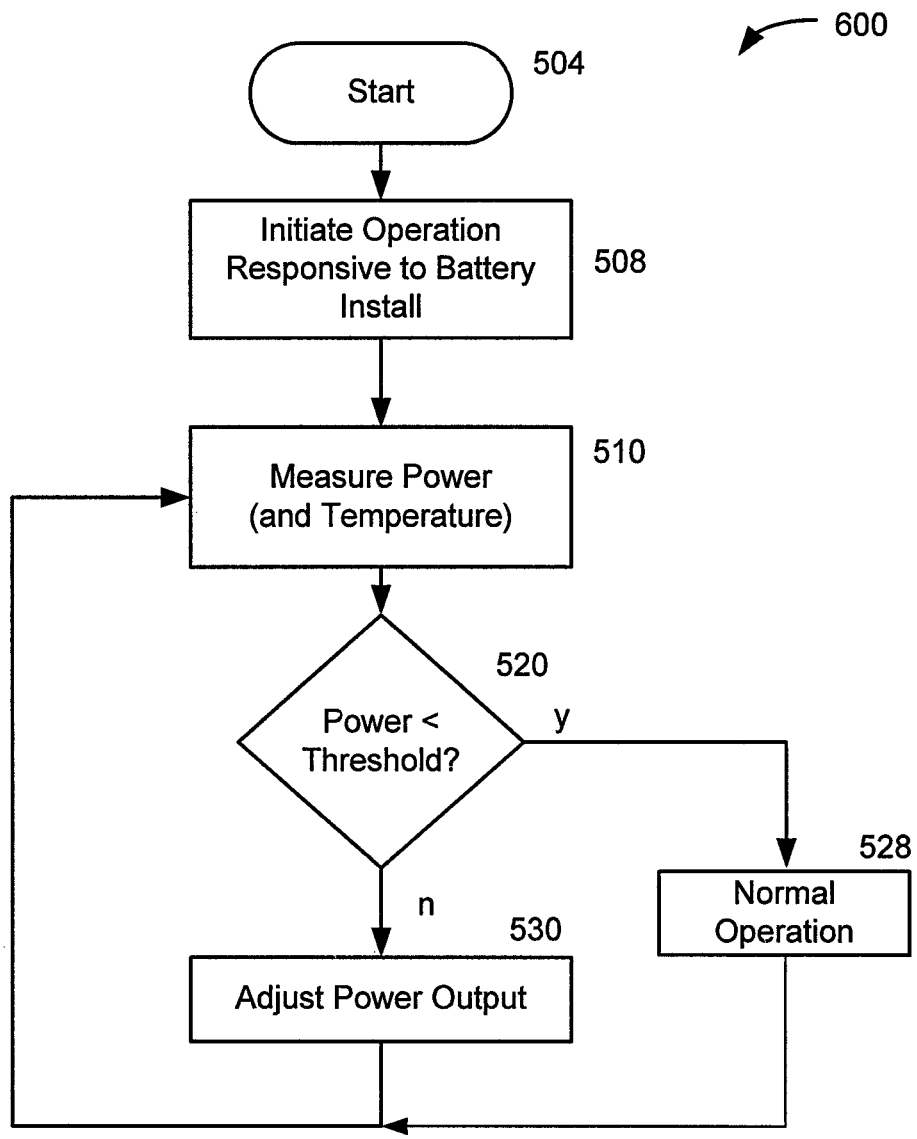
FIG. 5 is a flow diagram illustrating another embodiment of a method for operating an inground device in accordance with the present disclosure.

Attention is now directed to FIG. 5 which is a flow diagram depicting an embodiment of a method, generally indicated by the reference number 600, that provides dynamic control to implement constant transmitter power consumption during an inground operation, in accordance with the present disclosure. To the extent that method 600 shares steps with method 500, descriptions of shared steps will not be repeated for purposes of brevity. In accordance with method 600, however, responsive to the comparison at 520, normal operation 528 proceeds when the current power consumption is less than the power threshold value. On the other hand, whenever the current power consumption value violates the power threshold, the transmitter power is adjusted at 530. As part of the power adjustment step, the transmitter notifies any receiving devices such as, for example, portable device 20 of the power change. For example, the transmitter can transmit a data packet that indicates the new power level being used. The portable locator can then adjust its depth calibration automatically to reflect the different transmitter power. Accordingly, a substantially constant power draw can be maintained from the batteries throughout the duration of an inground operation.

Based on the foregoing, it should be understood that the result of the power adjustment in methods 500 and 600 can be a decrease in signal strength at a given position outside of the housing arrangement, for example, at the location of portable device 20, in order to accomplish a sufficiently constant power consumption by the transmitter. For example, a transmitter that is configured from the factory with a nominal output of 0.48 Watts under no load (i.e., outside of a housing) can yield a targeted signal strength at 10 feet as measured by the locator 20. This setting can be based on performance criteria in a known housing that has been deemed compatible. Therefore, any deviations from the design of the housing design will likely increase power consumption, thus requiring a reduction in signal strength to achieve the desired power consumption threshold. Particularly at job sites where there is little noise/interference, the use of a lower signal strength can be inconsequential as compared to the impact of compromising battery life that can otherwise be preserved by practicing the teachings that have been brought to light herein for purposes of maximizing battery performance.

Referring to FIG. 2, some embodiments of electronics package 200 may utilize antenna 340 as part of a tuned circuit that is commonly referred to as an LC tank circuit. In this regard, Applicants consider that such circuits do not provide acceptable control for stable amplitude oscillation and, thereby, output power when using a tank circuit. In this regard, the amplitude can change substantially once the transmitter is installed within a drill housing, resulting in an unpredictable change in battery power consumption. For this reason, the teachings that have been brought to light above remain equally applicable.

Applicants further recognize that mechanical shock and vibration encountered during an inground operation such as, for example, a horizontal directional drilling operation (HDD), can serve as an additional variable with respect to the achievement of enhanced battery performance. For example, C-cell batteries are a commodity item, generally used in flashlights and other commodity type electronics, and are not designed to meet the high performance needs of the HDD environment. Such batteries can perform differently with respect to brand in terms of energy storage and/or shock and vibration performance. Additionally, general use batteries can exhibit a wide range of performance variation as a function of temperature. For example, cold temperatures negatively impact the energy that can be drawn from such a battery cell. This temperature-based negative influence also varies on the basis of battery chemistry; for example, Lithium-ion performs more poorly in cold temperature as compared to Nickel Metal Hydride (NiMH). Cold weather, for example, in the range from −20° C. to +8° C., is typically the temperature range that has the greatest adverse impact on battery performance at least with respect to the HDD environment. In light of the foregoing recognitions and with respect to the variables that can impact battery performance, Applicants, through extensive testing and analysis, have empirically demonstrated that general use c-cell batteries offer relatively good performance for downhole transmitters when the power consumption is less than approximately 0.5 Watts. It should be appreciated that still lower power consumption, for example on the order of 0.4 Watts, provides still further enhanced performance. While lower power consumption at these lower levels serves to increase operating time in cold temperatures with respect to general purpose batteries, Applicants have discovered that these lower power consumption levels are also of benefit when adverse mechanical shock and vibration conditions are encountered.

Based on the recognized variables of power consumption, cold weather, and mechanical shock and vibration in conjunction with the interplay between these variables, Applicants recognize that still further enhancements can be made with respect to transmitter performance. For example, the power consumption threshold can be selectable based on other criteria present in the system. With reference to FIG. 5, if during the sensing of the transmitter power at 510, an additional measurement is performed to measure the ambient temperature during the inground operation, for example, using temperature sensor 224 of FIG. 2, the power consumption threshold can be configured to a different threshold that provides enhanced performance based on temperature. In this context, optimum (i.e., enhanced) performance is in relation to the battery performance in cold weather. For example, if the temperature is cold (0° C. or below), a threshold of 0.4 Watts can be selected by way of example. On the other hand, if it is warm (28° C.) then a threshold of 0.45 Watts, by way of example, can be selected. In an embodiment, the threshold(s) can be characterized as a function. For example, in one embodiment, the function can be a step function. For instance, a temperature threshold can be located at a temperature such as 8° C. such that a lower transmit power is used below this temperature and a higher transmit power is used above this temperature. In another case, the function can be represented by a polynomial such that the consumption power can be selectively or continuously adjusted for any given temperature within a particular temperature range. It should be appreciated that any suitable number of temperature thresholds can be defined that are distributed in any suitable manner.

Referring to FIG. 4, integration of the temperature variable into the constant power transmitter process can likewise be performed by step 510 of the subject figure during startup of the transmitter by reading temperature in conjunction with making the power determination. To account for the potential for multiple power threshold values, the calibration process of step 524 can be customized. For example, if the transmitter is configured above ground at 0° C. and the power consumption threshold value is selected such that 550 counts of signal, out of a potential 1000 counts, is measured by device 20, the power consumption threshold can be shifted dynamically, for example, as a function of discrete temperature set points. In an embodiment, device 20 can be notified of the change in the power consumption threshold such that the locator can adjust offset and scale signal strength calibration coefficients. Based on the notification, the calibration can be adjusted by using a table that is shared by the transmitter and the portable device, or via the transmitter periodically updating the current power setting as modulated on locating signal 120 such that the portable device can adjust its calibration parameters accordingly. In either scenario, a standard 10 foot calibration process remains relatively unchanged since the changes in power level (signal strength) can be extrapolated based on the consistency of the relationship between signal strength and the depth calibration coefficient.

In some embodiments, power consumption can be selectable, for example, based on forecasted mechanical shock and vibration in the bore. Such a setting can be manually entered and/or based on a measured value relatively early in the inground operation. For example, if the drilling soil is free of rocks, then it is likely that there will be little influence on battery performance with respect to shock and vibration. Mechanical shock and vibration can be detected to facilitate power consumption changes based on the drilling environment. When drilling in rock, the shock and vibration on the inground tool housing can be several hundred g's. The measurement range of typical MEMS accelerometers that are commonly used in horizontal directional drilling applications are often limited to +/−2 g, due to the need for high resolution. As a result of this limited dynamic range, such an accelerometer can constantly encounter its upper and lower limits, depending on the drilling conditions. Under adverse conditions with limited dynamic range, it is difficult to obtain a meaningful average pitch even by applying averaging to the pitch data. Accordingly, a low cost, high g, low resolution accelerometer 800 (FIG. 2) can be added to the sensor suite to track the average pitch when the inground tool is rotating. In still another embodiment, a MEMS accelerometer can be used which has programmable g range such that the pitch range can be reprogrammed on-the-fly when conditions are warranted.

The foregoing description of the invention has been presented for purposes of illustration and description. It is not intended to be exhaustive or to limit the invention to the precise form or forms disclosed, and other modifications and variations may be possible in light of the above teachings wherein those of skill in the art will recognize certain modifications, permutations, additions and sub-combinations thereof.

What is claimed is:

1. A transmitter that is powered by a battery and the transmitter is receivable in a housing to form part of an inground tool for performing a drilling operation in a drilling environment using a drill string that extends from a drill rig to the inground tool, said transmitter comprising:
   a regulator for generating a regulated voltage from a battery;
   an antenna driver powered from the regulated voltage for electrically driving an antenna to emanate an electromagnetic signal for remote reception based on power consumption from the regulator;
   a temperature sensor for measuring a temperature of the transmitter
   an accelerometer for generating accelerometer readings that at least characterize a pitch orientation of the inground tool; and
   a controller that monitors the power consumption and selectively limits the power consumption based on at least one power consumption threshold while continuing to drive the antenna to emanate the electromagnetic signal and for changing the power consumption threshold responsive to the temperature measured by the temperature sensor.

2. The transmitter of claim 1 wherein said controller is configured for reducing the power consumption threshold responsive to detecting that the temperature is at or below a temperature threshold.

3. The transmitter of claim 2 wherein said temperature threshold is 0° C.

4. The transmitter of claim 2 wherein the temperature threshold is represented by a function that varies with temperature.

5. The transmitter of claim 4 wherein the function is a step function.

6. The transmitter of claim 4 wherein the function is a polynomial function.

7. The transmitter of claim 1 wherein the controller is configured to lower the power consumption threshold based on adverse mechanical shock and vibration of the inground tool characterized by the accelerometer readings during the inground operation.

8. The transmitter of claim 7 wherein the battery is a general purpose battery and the adverse mechanical shock and vibration conditions at least affect performance of said battery.

9. The transmitter of claim 1 wherein the controller responds to a manually entered setting to specify the power consumption threshold for limiting the power consumption.

10. The transmitter of claim 1 wherein the controller automatically limits the power consumption.

11. The transmitter of claim 1 wherein said controller automatically measures the power consumption of the transmitter after stabilization following power-up.

12. The transmitter of claim 11 wherein said controller adjusts the power consumption of the transmitter in response to the measurement thereof so as not to exceed the power consumption threshold.

13. The transmitter of claim 1 forming part of an inground electronics package which further comprises a receiver that initiates transmission of said electromagnetic signal responsive to receiving an instruction.

14. The transmitter of claim 1 wherein said controller is configured for measuring the power consumption of the transmitter and initiating a calibration procedure responsive to detecting that the power consumption is less than the power consumption threshold.

15. The transmitter of claim 1 wherein said controller is configured for measuring the power consumption of the transmitter and decreasing the power consumption responsive to detecting that the power consumption is greater than the power consumption threshold.

16. The transmitter of claim 15 wherein said controller is configured for iteratively measuring the power consumption of the transmitter and adjusting the power consumption until the power consumption converges on the power consumption threshold.

17. The transmitter of claim 16 wherein said controller is configured to transmit a data packet that indicates a new power level after adjusting the power consumption.

18. The transmitter of claim 16 wherein said controller is configured for adjusting the power consumption by adjusting a duty cycle of the electromagnetic signal.

19. The transmitter of claim 16 wherein said controller is configured for adjusting the power consumption by adjusting a gain of the antenna driver.

* * * * *